June 20, 1939.   S. T. JEFFREYS ET AL   2,163,125
PHOTOSCULPTURE
Filed Oct. 14, 1936   2 Sheets-Sheet 1
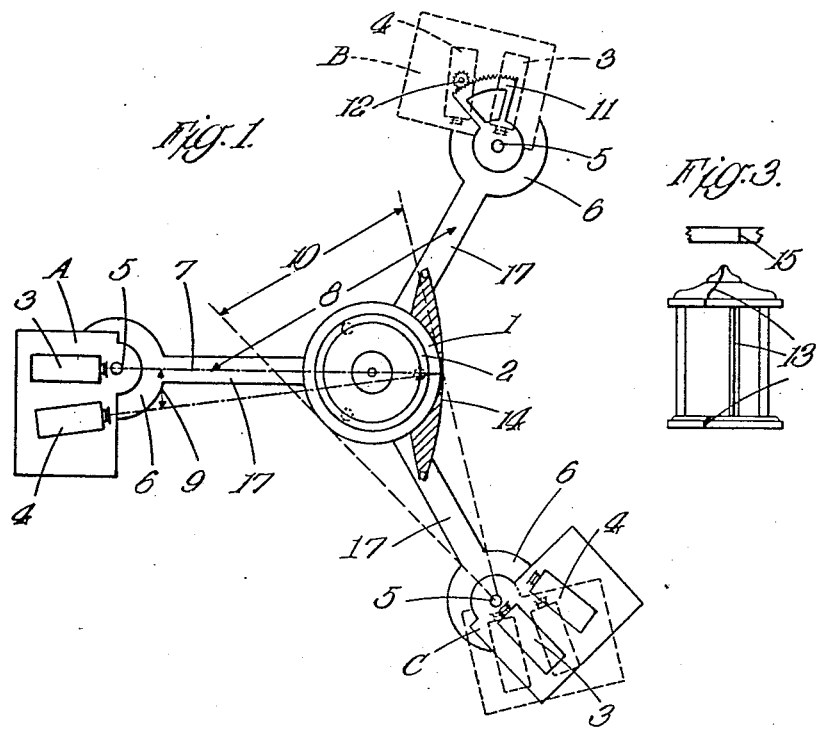
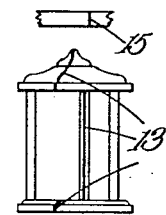
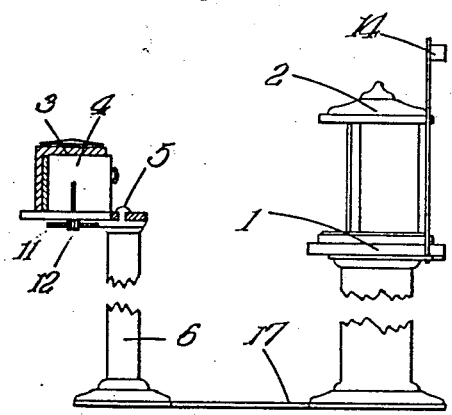
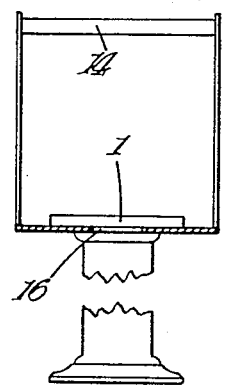
INVENTORS:
SIDNEY THOMAS JEFFREYS
AND HENRY JOHN PETTY
BY Haseltine Lake & Co.
ATTORNEYS June 20, 1939.    S. T. JEFFREYS ET AL    2,163,125
PHOTOSCULPTURE
Filed Oct. 14, 1936    2 Sheets-Sheet 2
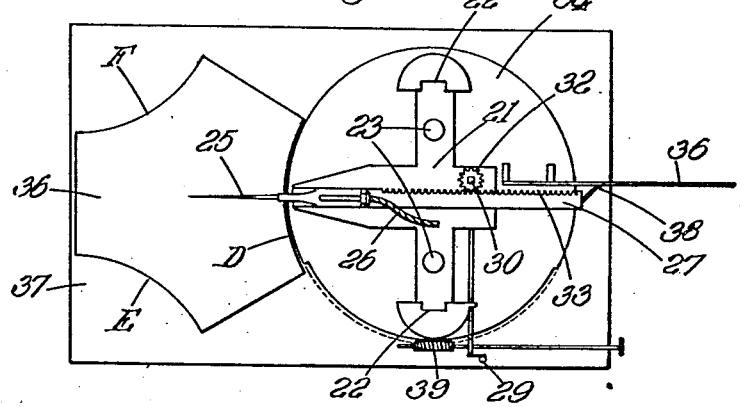
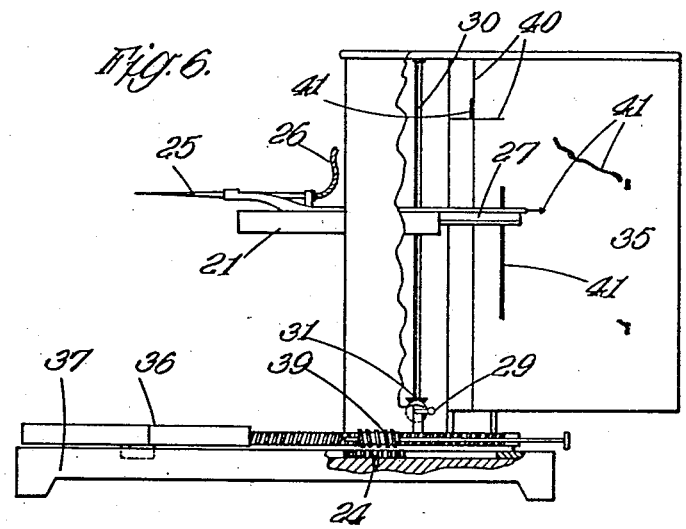
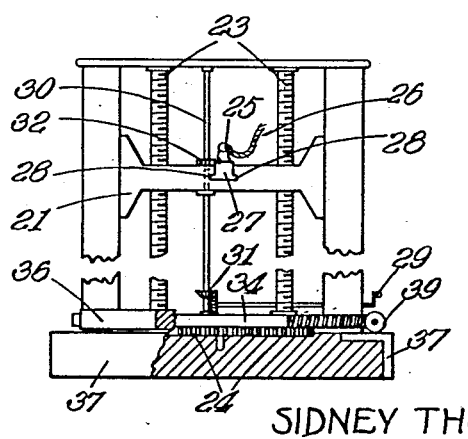
INVENTORS:
SIDNEY THOMAS JEFFREYS
AND HENRY JOHN PETTY
Haseltine, Lake & Co.
ATTORNEYS Patented June 20, 1939

2,163,125

UNITED STATES PATENT OFFICE 2,163,125

PHOTOSCULPTURE

Sidney Thomas Jeffreys and Henry John Petty, Newport, England, assignors to Photosculpture Limited, Newport, England, a British company Application October 14, 1936, Serial No. 105,530
In Great Britain October 16, 1935

2 Claims. (Cl. 88—24)

This invention relates to photosculpture, that is, to the production in solid material of models, copies, enlargements, or miniatures from a photographic record of the subjects photographed. The invention is more especially concerned with the reproduction by photographic means of subjects which are not of simple outline, and it provides improved means whereby subjects which have not hitherto been found suitable for being reproduced from photographs by the method known as photosculpture can be so reproduced, and further, objects which hitherto have been capable of being so reproduced can be reproduced with greater detail.

The general method of obtaining the photographic record as described in the specification of our British Patent No. 254,791 is utilised in this invention, viz: the projection of a beam of light upon the subject, such beam being partially intercepted by a preferably straight edged screen the edge of which preferably cuts the axis of the lens of the light projector in such a manner that a sharply defined outline or profile is exhibited on the subject as a shadow in a preferably vertical plane, and a photographic camera angularly spaced from the source of the beam of light is operated to take a series of photographs of the shadow so thrown, as the object moves in relation to the photographic and lighting apparatus, or vice versa, and from the photographic records so produced, or from guide sheets or plates produced therefrom, a model or copy of the subject can be reproduced from solid material in three dimensions, the outlines of sections of the subject according to the method described in the said prior British specification being taken axially and through a common centre of the subject, and according to the method described in the specification of our co-pending British application No. 28,626 of 1935 such sections are taken vertically and in parallel planes.

Whatever may be the shape of the subject, the shadow when viewed along the axis of the projector lens, appears as a straight line or a line corresponding to the edge of the screen and such shadow falls upon every surface of the subject in the same vertical plane and visible from the projector lens. In other words it follows the outline of a section of the subject taken at a known angle. When viewed from an angle in the same horizontal plane as the axis of the projector lens the shadow appears (if the subject is of irregular outline) as an irregular line representing a true or foreshortened view of the outline of the section of the subject, according to the angle from which the shadow is observed.

According to the invention a photographic camera is angularly spaced from the source of the beam of light, the angle between the axis of the projector lens and the optical axis of the camera lens being known and being hereinafter referred to as the "light photo angle" and is operated to take a series of photographs of the shadow as the shadow is caused to traverse the surfaces of the subject as hereinafter described, thus recording the outline of sections of the subject taken at known positions and angles. Two or more cameras and light projectors may be employed, each camera and light projector being mounted upon a common table in such a manner that the table may be partially rotated horizontally upon an axis (hereinafter referred to as "the axis of the recording apparatus") such axis being vertically below the axis of the projector lens. The subject is placed upon a stand equidistant from the axis of each recording apparatus used.

Each camera and light projector employed (hereinafter together referred to as "the recording apparatus") is so mounted upon its table that the point of intersection of the beam of light and the optical axis of the camera lens (the angle between which is hereinafter called the "light-photo angle") is at the centre of the stand upon which the subject is placed, or at a known distance from the said centre.

During the process of obtaining the photographic record each recording apparatus moves on its axis, the axis of the beam of light describing a horizontal arc, so that the shadow thrown by the lighting apparatus first falls on one side of the subject and traverses such of its surface or surfaces as are visible viewed along the axis of the beam of light until it reaches the opposite extremity of the subject. During its travel a series of photographs is taken by the camera apparatus (the operative mechanism of which is suitably connected with the movement of the recording apparatus) which record the shape of the shadow at a known number of points and at known positions during the movement of the recording apparatus.

Each recording apparatus operates similarly, moves through the same angle and preferably takes the same number of photographs during its operation and may either be arranged to operate simultaneously or successively.

By this method a record is obtained of the outlines of sections of the subject taken at any desired angle or angles according to the positions in which the recording apparatuses are placed in relation to the subject.

By a modification of this invention suitable for photographically recording sectional outlines of inanimate objects, instead of several recording apparatuses being used, one may be adapted so as to enable it to be moved into different positions about and equi-distant from the centre of the stand upon which the subject is placed, or alternatively the stand itself may be adapted to be rotated horizontally so that after the recording apparatus has taken a series of photographs of the subject viewed from one angle the stand may be partially rotated and further series taken from another known angle or angles about the circumference of the subject.

To facilitate accurate projection or setting of the outlines so obtained (or of guide sheets or templates prepared therefrom) in the reproducing machine a radius indicator is used during the photographic process on which the beam of light falls and the object of which is to enable a record to be made on one or more, or preferably each, of the photographs taken, of a point at a known distance from the axis of the recording apparatus.

A suitable form of radius indicator is a curved strip having a flat vertical surface and in plan view shaped as a segment of a circle having as its centre the axis of the recording apparatus. This radius indicator is mounted behind and above the subject when viewed from the recording apparatus and is adapted to enable it to be rotated about the centre of the stand on which the subject is placed so that it can be moved into its proper position behind the subject (when viewed from the projector) as each successive series of photographs is taken.

The apparatus for reproducing the models comprises a control screen upon which the photographic records of each outline or guide sheets prepared therefrom (either of which are hereinafter included in the term "recorded outline") are optically projected or otherwise placed in position (the recorded outlines being corrected to their true proportions if desired according to the method described in our prior British Patent Specification No. 254,791) and a cutting or sculpturing machine adapted to cut or inscribe in a block of solid material an outline corresponding in shape to any sectional outline appearing on the control screen and in the same position relative to the block as the sectional outline appeared in the original subject when photographed.

The operation of the reproducing machine may be in part mechanical and in part manual, or may be entirely automatically controlled according to the method described in the pending British application of the above named Sidney Thomas Jeffreys No. 14,382 dated May 21, 1936.

In order that the said invention may be clearly understood and readily carried into effect the same will now be described more fully with reference to the accompanying drawings which illustrate a form of apparatus which may be used when a series of photographs of the subject are taken from three angles. The apparatus illustrated obviously may be adapted to take series of photographs from any desired number of angles and to reproduce models from the photographic records so obtained.

Figure 1 represents in plan a simple form of apparatus suitable for obtaining by photographic means a record of the shape of outlines of sections of the subject; a series of photographs being taken from three different points about the circumference of the subject.

Figure 2 represents in side elevation one recording apparatus, the stand upon which the subect is placed, with a subject thereon and also a form of radius indicator.

Figure 3 illustrates the appearance of the shadow projected upon the subject and the radius indicator.

Figure 4 represents a suitable form of radius indicator in front elevation (viewed from the recording apparatus in operation).

Figures 5, 6, and 7 represent respectively a plan view and side and front elevation of a simple form of reproducing machine.

A stand or table 1 (Figures 1 and 2) is provided upon which is placed the subject 2 intended to be reproduced. Spaced around the stand 1 are three tables A, B, and C each carrying a recording apparatus, comprising a projector 3 and a cinematographic camera 4. Each table A, B, and C is adapted to be partially rotated horizontally upon a vertical axis 5. The movement of tables A, B and C upon their axes 5 is equal and through a known angle and so that the beam of light 7 describes an arc 10 at one extremity of its movement striking one side of the stand 1 and at the other extremity of its movement the opposite side of the stand 1.

Pillars and mountings 6 carrying the tables A, B and C are preferably rigidly connected to the stand 1 by connecting pieces 17, the pillars and mountings 6 being so spaced that their respective axes 5 are equidistant from the centre of the stand 1 and so that the angles 8 between the connecting pieces 17 are preferably equal, or in any case are known.

In the apparatus described in the following drawings the said angles 8 will be assumed to be equal.

The projectors 3 are mounted on the tables A, B and C so that optical axes if their respective lenses are in the same respective vertical planes as the axes upon which the tables A, B, and C rotate and are each adapted to project a beam of light 7 upon the subject 2 the beam being intercepted by a preferably straight edged vertical screen (the edge of which cuts or is in close proximity to the axis of the beam of light) in such a manner as to throw a vertical shadow upon the subject.

Each camera 4 is mounted so that the angle 9 between the axis of the lens of the projector 3 and the optical axis of the camera lens 4 is known (the angle 9 being hereinafter referred to as the "light-photo angle") and so that the point of intersection of the optical axes of the projector and camera is at or near a point vertically above the centre of the stand 1.

The operating mechanism of each camera 4 is by suitable means synchronised with the movement of the tables A, B, and C upon their axes 5, for example by a toothed quadrant 11, rigidly attached to the pillars 6 and engaging with a pinion wheel 12 connected with the camera mechanism and so arranged that a photograph is taken at known intervals during the movement of the tables A, B, and C and a known number of photographs taken during complete movement.

The subject 2 the sectional outlines of which it is desired to record is placed upon the stand 1 and each table A, B, and C moved preferably in succession so that the beam 7 traverses the subject 2 and the number of photographs taken during the movement being known a record is obtained of the outline of a number of sections taken at known or determinable angles in the arc 10 through which the recording apparatus moves.

Assuming the beam 7 is in the centre of its travel, i. e., in the position in which table A is shown, the shadow thrown by the beam on the subject 2 when viewed from the lens of the camera 4 on the table A will appear approximately as represented by the black line 13 in Figure 3.

A radius indicator 14 consists of a preferably narrow horizontal screen shaped as the segment of a circle the centre of which is the axis 5 of the recording apparatus in use. This form of radius indicator is mounted as illustrated and is adapted to be rotated about the stand 1 upon a bearing 16 so that as each series of photographs is being taken it may be moved into position behind the subject 2 when viewed from the recording apparatus in operation.

The beam of light 8 falls on the radius indicator during its travel and the position of the shadow thrown is recorded on each photograph and appears (in one position) as illustrated in Figure 3 (15). The line or mark 15 so recorded may be used for adjusting the setting of the recorded outlines in the reproducing apparatus hereinafter described.

By an obvious modification of this invention particularly suitable for recording the outline of inanimate subjects instead of several tables A, B, and C and their components being used, one recording apparatus may be employed and after each series of photographs is taken moved about the stand 1 so that the subject 2 may be photographed from a fresh and known angle.

In such modification the connecting piece 17 is adapted to rotate about the centre of the stand 1 or alternatively the stand 1 and the subject thereon 2 may be rotated relatively to the recording apparatus.

Referring now to Figures 5, 6, and 7 a table 21 is adapted to move vertically in guides 22 its vertical movement being operated through threaded rods 23 preferably power driven through the pinion wheels 24.

Upon the table 21 is fitted a tool-carrier 27 upon which is mounted a cutting tool 25 operated by a flexible drive 26 or other suitable means. The tool-carrier 27 is adapted to move horizontally in guide slots 28 (Figure 7) and to operate the feeding and withdrawal movement of the cutting tool 25. Connected to the tool-carrier 27 and moving in unison therewith is a pointer or indicator 33 touching or in close proximity to the surface of the control screen 35. The feeding and withdrawal movement of the cutting tool 25 is controlled by a handle 29 which rotates a square section rod 30 through bevel pinions 31.

Mounted upon the table 21 is a pinion wheel 32 adapted to slide upon the square section rod and to move vertically with the table. The pinion wheel 32 engages in a rack 33 upon the tool-carrier 27 causing it to move in one direction or the other according to the direction of rotation of the handle 29.

The guides 22, a table 21 and its components are mounted upon a platform 34 which is constructed partially to rotate upon a vertical axis vertically below the axis of the cutting tool 25 so that the cutting tool may be caused to describe an arc identical with the arc described by the beam of light during the photographic process previously described and at the centre of its movement cutting the vertical axis of the turntable 36.

Also mounted upon the platform 34 is a control screen 35.

In the process of reproduction a block of suitable material is placed and rigidly fixed upon the turntable 36 which turntable is mounted adjacent to and preferably upon a common bedplate 37 with the cutting mechanism previously described. If reproduction of the subject is to be in true proportion and to the same scale as the original the distance between the centre of the platform 34 and the centre of the turntable 36 should be the same as the distance between the axes of the recording apparatus 25 and the centre of the stand 1 previously described in reference to Figure 1; but if the reproduction is to be of increased or reduced size, the distance between the centres of the platform 34 and turntable 36 should be proportionately greater or less as the case may be. Assuming that the movement of the tables A, B and C in Figure 1 upon their axes during the photographic process has been in a clockwise direction, then the platform 34 will, at the commencement of the reproduction process be set at one extremity of its movement and so that its ensuing movement will be in a clockwise direction. The first recorded outline of a series being projected or placed upon the screen, being first corrected into its true proportions in manner previously described and in such a manner that the record of the radius indicator coincides with setting marks 40 previously marked or inscribed on the control screen and the table 21 being at one extremity of its vertical movement, the pointer 38 is caused to follow the shape of the recorded outline in the manner described in our previous British Specification No. 254,791 and the cutting tool 25 to inscribe a line corresponding in shape in the block upon the turntable 36.

The next successive recorded outline is then projected or placed upon the control screen 35 and the platform 34 rotated in a clockwise direction by the worm wheel 39 through such an angle as will enable the next outline to be cut in its relative position. For example, assuming that the arc described by the beam of light 7 in Figure 1 is 30° and that during its movement 300 photographs at evenly spaced intervals are taken by the camera 4 in Figure 1 then after such cut inscribed by the cutting tool 25 in the block, the platform 34 will be turned one tenth of a degree.

After the recorded outlines obtained from one aspect of the subject have been reproduced in the block the turntable 36 is turned so that the next series of outlines may be cut in their relative positions and the process repeated until all recorded outlines have been reproduced in their relative position in the block.

For example, if the first series of recorded outlines to be reproduced in the block is that obtained from the position of table A in Figure 1 during the cutting operation the turntable 16 is set and rigidly fixed by suitable means with the recess D opposite the platform 34 and when the cutting operation for the series obtained from the positions of the tables B and C in Figure 1 the turntable is rotated until the recesses E and F respectively coincide with the perimeter of the platform 34.

What we claim and desire to secure by Letters Patent of the United States is:

1. The method of obtaining photographic records of successive profiles of an object, including placing the object in a central position, disposing a plurality of light projectors equidistantly spaced from each other around the object and at equal radial distances from the vertical center of the object; intersecting each of said light beams by a shadow-casting element having a straight vertical edge to thereby cast a vertical shadow on the object at the intersection of each light beam with the object; disposing a camera in association with each projector and with its optical axis permanently intersecting a corresponding beam at a point adjacent the vertical center of the object, cutting off all extraneous light from the object except the light from said beams; rotating each projector and its corresponding camera around a vertical center intersecting a radial line coincident with the corresponding light beam and through a predetermined arc so that each light beam and vertical shadow shall sweep over an equal angle, the several arcs equalling a full circle; and simultaneously operating the several cameras to take a plurality of successive pictures of the edges of said shadows at successive points on said object.

2. The method of obtaining photographic records of successive profiles of an object, which consists in placing the object in a central position, disposing a plurality of light projectors spaced apart from each other around the object and at predetermined corresponding radial distances from the vertical center of the object; intersecting each of said light beams by a shadow-casting element having a straight vertical edge to thereby cast a vertical shadow on the object at the intersection of each light beam with the object; disposing a camera in association with each projector and with its optical axis permanently intersecting a corresponding beam at a point adjacent the vertical center of the object, cutting off all extraneous light from the object except the light from said beams; rotating each projector and its corresponding camera around a vertical center intersecting a radial line coincident with the corresponding light beam and through a predetermined arc so that each light beam and vertical shadow shall sweep over an equal angle, the several arcs equalling a full circle; and simultaneously operating the several cameras to take a plurality of successive pictures of the edges of said shadows at successive points on said object.

SIDNEY THOMAS JEFFREYS.
HENRY JOHN PETTY.